United States Patent
Postema

[19]

[11] Patent Number: 5,586,604

[45] Date of Patent: Dec. 24, 1996

[54] AERATOR

[76] Inventor: Leonard F. Postema, 830 Ranchwood Trail, Woodstock, Ga. 30188

[21] Appl. No.: 584,980

[22] Filed: Jan. 11, 1996

Related U.S. Application Data

[63] Continuation-in-part of Ser. No. 508,322, Jul. 27, 1995, which is a continuation-in-part of Ser. No. 252,244, Jun. 2, 1994.

[51] Int. Cl.$^6$ .................................................. A01B 45/02
[52] U.S. Cl. ............................................. 172/21; 172/611
[58] Field of Search ............................. 56/256; 111/135, 111/137; 172/21, 22, 239, 540, 541, 544, 611, 662, 705

[56] References Cited

U.S. PATENT DOCUMENTS

| | | |
|---|---|---|
| 160,489 | 3/1889 | Webster . |
| 1,186,375 | 6/1916 | Burrows . |
| 1,224,346 | 5/1917 | Wingquist . |
| 1,802,711 | 4/1931 | Fitts . |
| 1,840,552 | 1/1932 | Ackerman . |
| 2,244,099 | 6/1941 | Chase . |
| 2,314,035 | 3/1943 | Dontje . |
| 2,353,345 | 7/1944 | Lindskog . |
| 2,559,232 | 7/1951 | Simon ............................... 97/212 |
| 2,752,838 | 7/1956 | Rudio . |
| 2,759,310 | 8/1956 | Newkirk . |
| 2,813,389 | 11/1957 | Padrick . |
| 3,119,278 | 8/1965 | Dye . |
| 3,706,346 | 12/1972 | Vissers ............................... 172/102 |
| 3,747,687 | 7/1973 | Bodine ............................... 172/40 |
| 3,794,121 | 2/1974 | Drozak ............................... 172/21 |
| 3,799,079 | 3/1974 | Dietrich ............................... 111/7 |
| 3,993,143 | 11/1976 | Moreland, Jr. ............................... 172/22 |
| 4,020,907 | 5/1977 | Luck ............................... 172/554 |
| 4,202,415 | 5/1980 | Barlage . |
| 4,425,972 | 1/1984 | Steinberg ............................... 172/551 |
| 4,750,441 | 6/1988 | Pfenninger et al. ............................... 111/85 |
| 4,773,486 | 9/1988 | Huber et al. . |
| 4,776,404 | 10/1988 | Robers et al. ............................... 172/21 |
| 4,802,536 | 2/1989 | O'Neal . |
| 4,883,371 | 11/1989 | Matsumato . |
| 4,921,051 | 5/1990 | Annen ............................... 172/21 |
| 5,029,652 | 7/1991 | Whitfield . |
| 5,036,655 | 8/1991 | Holloway ............................... 56/256 |
| 5,183,120 | 2/1993 | Watanabe ............................... 56/256 X |
| 5,209,306 | 5/1993 | Whitfield ............................... 172/21 |
| 5,398,769 | 3/1995 | Staples ............................... 172/21 |
| 5,460,229 | 10/1995 | Mattis ............................... 172/21 |

FOREIGN PATENT DOCUMENTS

| | | |
|---|---|---|
| 651522 | 10/1964 | Belgium . |
| 934927 | 1/1981 | U.S.S.R. . |
| 1531869 | 2/1987 | U.S.S.R. . |

*Primary Examiner*—Terry Lee Melius
*Assistant Examiner*—Robert Pezzuto
*Attorney, Agent, or Firm*—Hopkins & Thomas

[57] ABSTRACT

A multiple tandem castering aerator assembly is provided for mounting to the rear portion of a commercial lawnmower deck. The assembly comprises a set of tandem castering aerator wheel assemblies having a pair of vertically moveable pivot plates that bear a weighted wheel and a spiked aerator wheel assembly. The aerator wheel assembly has four curved tines and is rotatably mounted between the pivot point of the pivot plate and the weighted wheel. The assemblies caster behind and follow a moving lawnmower and the weighted wheel provides sufficient force for driving the aerator wheel tines into the ground for aeration of the soil.

22 Claims, 4 Drawing Sheets

AERATOR

REFERENCE TO RELATED APPLICATION

This application is a continuation-in-part of pending application Ser. No. 08/508,322 filed on Jul. 27, 1995, which, in turn, is a continuation-in-part of pending application Ser. No. 08/252,244 filed on Jun. 2, 1994.

TECHNICAL FIELD

This invention relates generally to lawn care and more particularly to devices for aerating the soil of a lawn to cultivate thick and healthy grass. Specifically, the present invention relates to an aerator assembly for mounting to the back of a commercial lawnmower for aerating the soil as a lawn is mowed.

BACKGROUND OF THE INVENTION

Modern lawns require a great deal of care and attention in order to nurture a thick green carpet of grass. Such care includes consistent mowing, watering, and thatching, as well as periodic overseeding and fertilization. In addition, it is imperative that a healthy lawn be aerated at least twice a year and, preferably, even more often. Aeration usually entails creating a multitude of closely spaced small holes in the surface of the ground to assist in the absorption of oxygen and nutrients into the soil. The holes also tend to increase moisture penetration into the soil and serve as receptacles for grass seed to prevent the seed from being washed away and to promote germination and growth.

Numerous lawn aeration devices have been available. One such device comprises a large cylindrical drum studded about its periphery with a plurality of short radially extending spikes. The drum is rolled or pulled over the ground and, as it rolls, the spikes are driven into the soil to create shallow holes. While this device is widely used and has proven somewhat successful, it is nevertheless plagued with numerous problems and shortcomings inherent in its design. For example, since the spikes necessarily engage the ground at an angle and are rotated laterally through the soil, significant force is required to penetrate the ground and move the spikes through the dirt. As a result, the drums of these devices generally are relatively large and usually are filled with water or sand to provide sufficient weight to drive the spikes into and through the soil. In some instances, auxiliary racks are provided to load even more weight onto such aerators. To frustrate matters more, the density of spikes on the drum and thus the density of holes the aerator can make in the soil is severely limited since the weight of the device is inherently inadequate to drive more than a few of the spikes at a time into and through the soil. Finally, as each of the spikes of this device is forcibly driven into the soil, it pushes aside and down the dirt to make room for the spike. This is the action that actually creates the hole; however, it also necessarily compacts and hardens the soil around the sides and bottom of the hole. As a result, penetration of air from within the hole into surrounding soil is reduced as is the penetration of moisture. Consequently, the efficiency and advantages of the aeration are reduced.

Another lawn aeration device seeks to address the soil compaction problems of drum and spike aerators by providing hollow spikes that actually pierce the ground and remove a plug of soil to create a hole. During each penetration of the ground, another soil plug is forced upwardly through the hollow spike and the plugs are simply ejected from the spike at its upper extent. While these types of devices, commonly known as pluggers or core type aerators, tend to reduce the compaction of soil around the sides of the holes, they nevertheless do not eliminate it. This is because the soil must still be parted to accommodate the thickness on the walls of the hollow spikes as they pierce the soil. In addition, such hollow spike aerators still require significant force to drive them into and through the soil and thus still require large, heavy, and cumbersome structures for proper operation. This is due to the relatively high sliding friction of the soil plug through the hole in the spike requiring extra force to drive the plug through the soil. As a result of this extra force, the extracted plugs are usually highly compacted dowel-like plugs, which do not break up and disperse quickly.

Because of their weight, many lawn aerators, and almost all commercial lawn aerators, are motorized. This not only makes them expensive but also renders them difficult to use. When the heavy spike drums are driven over the ground by their motors, they naturally bump, bounce, and shake about as the spikes are driven into and through the soil. This can create significant fatigue for users of these aerators. Further, the unitary drum construction of these devices renders them very difficult to turn at the end of an aerating run and the drum often must be manually scraped about in an arc to achieve the turn. This is not only cumbersome, it also tends to destroy healthy grass already growing in the lawn and can create an unsightly mess, particularly in moist or wet soil.

Slicer aerators having harrow-like discs or thin curved knife blades that create or cut a narrow furrow, slice, or series of narrow slices in the soil, are also available. These devices embody a problem in that they tend to create narrow soil openings that close up very quickly, especially when stepped upon. In addition, the force required for penetration of the soil can be significant in these types of aerators so that substantial weight must be provided for their operation. As a result, these type of aerators, which are common for commercial use, tend to be mounted on frames that can be pulled behind a tractor. Obviously, this limits the use of these aerators significantly and generally makes them useful only for large scale operations such as the aeration of golf courses and sports fields. Even if a slicer aerator concept was adapted to a small lawn, the thin easily closed slices produced by these aerators still would be unacceptable.

Many of the problems associated with prior art lawn aerators have been addressed for small scale consumer aeration through the inventions described and claimed in applicant's pending U.S. patent applications, of which the present application is a continuation-in-part. The inventions disclosed in these pending applications are hereby incorporated by reference. In general, these unique inventions include a novel aerator wheel having a hub and four curved tines projecting therefrom. The placement, curvature, size, and configuration of the tines has been found to provide surprisingly exceptional soil penetration as the aeration wheel rolls across the ground. This is because the configuration of the tines takes advantage of knife-like soil piercing and the assistive force of a previous tine pulling itself out of the soil to provide much of the force necessary to drive the next successive tine into the soil. As a result, these aerator wheels require relatively little additional downward force for their proper operation. This phenomenon makes it possible to mount two or three of the aerator wheels on the back of a consumer lawnmower where the small force required to drive the wheels across the ground for aeration is provided by the weight of the mower itself.

While the inventions of the parent applications hereto have proven especially useful for attachment and use with consumer lawnmowers, they have not proven completely acceptable for use with large commercial walk-behind lawnmowers. This is due at least in part to the fact that, with commercial lawnmowers, it is desirable to provide six or more spiked aerator wheels across the mower breadth for providing aeration holes in the ground of sufficient density. This requirement in conjunction with the weight distribution on a typical commercial lawnmower makes it undesirable to use the weight of the mower itself to drive the aerator wheel spikes into and through the soil because the resulting lift on the mower can cause it to loose traction.

Accordingly, there exists a continuing need for an aerator assembly that can be conveniently mounted to the back deck of a commercial lawnmower for aerating the soil as the lawn is mowed. Such an aerator assembly should provide at least six spiked aerator wheels for acceptable aeration density and should not make use of the weight of the mower itself to drive the aerator wheels into and through the soil. In addition, such a commercial aerator assembly should track the movement of the lawnmower, even when the mower is engaged in tight turns and even when it is reversed and moved backwards. The aerator assembly should not interfere with the normal operation of the lawnmower to which it is attached and should provide superior aeration by producing holes in the soil with loose dirt sides and by depositing dirt from the hole onto the top of the ground for disbursement. Finally, such a commercial aerator should be economical to produce, market and use and should be simple to install on the back of a commercial lawnmower deck. It is to the provision of such a commercial aerator assembly that the present invention is primarily directed.

SUMMARY OF THE INVENTION

Briefly described, the present invention, in one preferred embodiment thereof, comprises an improved aerator assembly for attachment to the deck of a lawnmower to aerate the soil of a lawn as the mower moves across the ground. The assembly is primarily intended for use with commercial walk-behind mowers but could be used with riding mowers or as a stand-alone unit. The aerator assembly comprises a frame adapted to be mounted to the deck of a mower with the frame extending a predetermined distance rearwardly of the mower deck. At least one, and preferably three, elongated caster pins are rotatably secured to the frame with each caster pin extending substantially vertically from a top end to a bottom end. A transversely extending pivot plate axle is secured to the bottom end of each caster pin. A pair of pivot plates, each having a proximal end portion and a distal end portion are pivotally secured at their proximal end portions to the ends of the pivot plate axle. In this way, each of the pivot plates are pivotally mounted to the ends of the pivot plate axle for vertical pivotal motion of the pivot plates between a lowered positioned and raised position.

A substantially circular weighted wheel having a predetermined weight and diameter is mounted to each of the pivot plates adjacent its distal end for rotation of the weighted wheel about a substantially horizontal axis. The weighted wheels are positioned on the pivot plates so that they roll on the ground when the aerator assembly is attached to a mower and the pivot plates are in their lowered positions. In this way, the caster pin, pivot axle, pivot plates, and weighted wheels form a tandem caster assembly that naturally follows the lawnmower through rotation of the castor pin as the mower moves across the lawn.

A spiked aerator wheel is mounted to each of the pivot plates at a location intermediate the proximal end portion of the pivot plate, where it is mounted to the pivot plate axle, and the mounting location of the weighted wheel; that is, the aerator wheel is mounted between the pivot point and the weighted wheel. Each of the aerator wheels has a plurality of substantially radially projecting tines extending outwardly from a central hub and in general is configured according to the disclosures of applicant's pending U.S. patent applications forming the parents of the present application. The aerator wheels are vertically located on the pivot plate so that the weight of the weighted wheel causes the tines of the aerator wheel to be driven into and through the ground at the proper depth to aerate the soil as the entire assembly casters behind a moving commercial lawnmower.

In the preferred embodiment, three of the just described castering aerator assemblies are mounted along the frame that is secured to the back of a commercial lawnmower. The assemblies are each sized and configured so that they can rotate about their caster pins through a complete 360 degree circle to accommodate any possible movement of the lawnmower to which they are attached. Furthermore, the weighted wheels and the moment arm provided by the positioning of the weighted wheels and the aerator wheels relative to the pivot point of the pivot plate provides all of the necessary weight to drive the tines of the aerator wheels into and through the soil. Accordingly, the weight of the mower is not relied upon so that there are no adverse effects on the operation of the mower itself. Finally, each of the tandem castering aerator assemblies can be raised and locked in its raised position when not needed and the entire frame to which the castering aerator assemblies are attached can be raised and locked if desired when no aeration is required.

Thus, it is seen that an improved commercial aerator for attachment to the back of a commercial lawnmower is now provided that is small, compact, virtually transparent to a user in operation, and that provides aeration superior even to existing commercial aerators at the same time as a lawn is being mowed with the mower. The castering aerator assembly of this invention is significantly less expensive than prior art commercial aerators, is simple and easy to use, functions in conjunction with all motion of the lawnmower to which it is attached, and allows the user of a commercial lawnmower to provide aeration services at a lower cost and at less investment in time and effort. These and other objects, features, and advantages of the invention will become more apparent upon review of the detailed description set forth below when taken in conjunction with the accompanying drawing figures, which are briefly described as follows.

DETAILED DESCRIPTION OF THE PREFERRED EMBODIMENT

Figure 1:
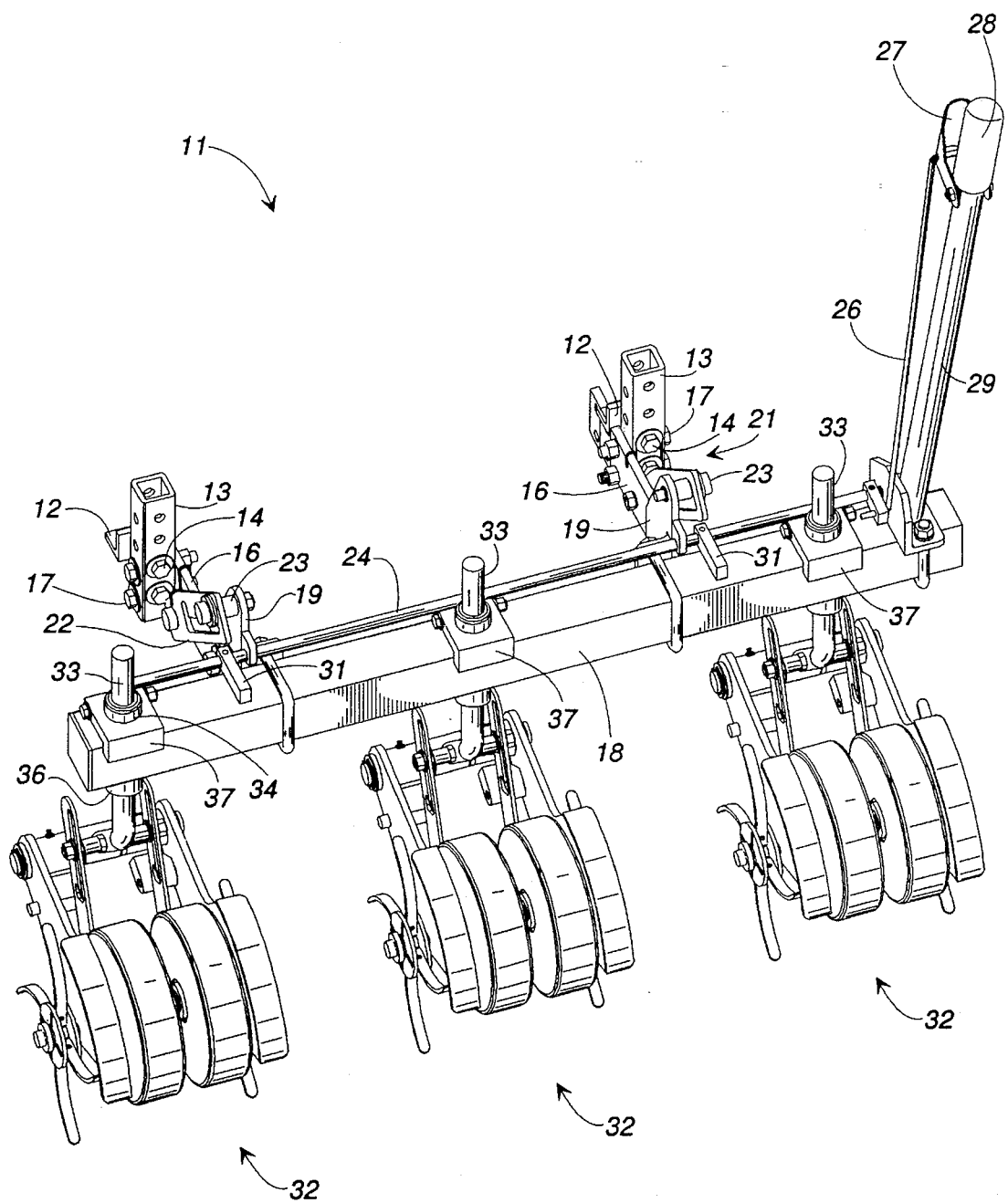
FIG. 1 is a perspective view of a castering commercial aerator assembly that embodies principles of the present invention in a preferred form.

Referring now in more detail to the drawings, in which like numerals refer to like parts throughout the several views, FIG. 1 illustrates a commercial aerator assembly that embodies principles of the present invention in a preferred form. The aerator assembly 11 is designed to be mounted to the back portion of a commercial lawnmower deck. For this purpose, the assembly comprises a pair of deck extension angles 12, which are each bolted to the lawnmower deck at an appropriate location on the back of the deck. A mounting tube 13 is bolted by means of bolts 14 to each of the deck extension angles 12 with the mounting tubes 13 extending substantially vertically with respect to the mower deck. Each mounting tube 13 is provided with a set of alternate through bores for adjusting the vertical position of the mounting tube relative to the deck to accommodate various models and styles of lawnmowers.

A mower mount pivot plate 16 is secured with bolts 17 to each of the mounting tubes 13 and extends rearwardly therefrom a predetermined distance as illustrated. The length of the mower mount pivot plates is chosen to space the aerator assembly a sufficient distance behind the deck of a lawnmower to which it is mounted so that the tandem castering aerator wheel assemblies, as described below, can rotate through a full 360 degrees without impacting the back of the mower deck.

An elongated metal draw bar 18 is pivotally secured by means of a pair of pivot brackets 19 to the distal ends of the mower mount pivot plates 16. In this way, the draw bar 18 can be pivoted up and down to move the tandem castering aerator wheel assemblies from a lowered operating to a raised stowed position respectively. To accommodate such motion and the locking of the draw bar in its raised position, a latching assembly 21 is provided at the mounting location of each of the pivot brackets 19. The latching assembly 21 comprises a vertically pivoting latch bar 22 formed with a notched slot that receives a pivot pin 23 secured to the top of the pivot bracket 19. A cross rod 24 extends along the length of the draw bar and is rotatable. The cross rod 24 is coupled through a lift release pull rod 26 to a lift release lever 27 mounted adjacent the grip 28 of a lift handle 29. With this configuration, when the lift release lever 27 is depressed, this causes the cross rod 24 to rotate rearwardly. This, in turn, causes a pair of cross rod cam blocks 31 to rotate around, engage the latch bars 22, and raise them so that the latch pins are moved out of the upper notches of the latch bars. The entire draw bar 18 can then be rotated upwardly by pushing the lift handle 29 forward until the lower notches of the latch bars 22 fall over the latch pins 23. This locks the draw bar 18 in its raised position. Preferably, the latch bar is spring biased toward the latch pin to aid in this process. To lower the draw bar 18, the lift release lever 27 is again depressed, which raises the latch bars 22 to move the latch pins out of the lower notches so that the draw bar 18 can be lowered. In this way, the entire draw bar 18, and consequently the aerator wheel assemblies mounted thereto, can be raised and locked in a stowed position, or lowered and locked in an operating position as required by the operator.

A set of three tandem castering aerator wheel assemblies 32 are mounted to and extend downwardly from the draw bar 18. A detailed description of these assemblies is provided hereinbelow. In general, however, each of the assemblies 32 comprises a caster pin 33 that is rotatably secured by an upper bearing 34 and a lower bearing 36 to the draw bar 18. Each of the caster pins 33 has an upper end portion and a lower end portion. An adjustable caster pin dampening block 37 is provided for dampening or resisting rotational movement of the caster pins 33 within the bearings 34. This functions to prevent the aerator wheel assemblies 32 from flopping around when the draw bar 18 is locked in its raised position. The dampening blocks are tightened until they effectively resist unwanted rotation of the assemblies but nevertheless do not interfere with the normal castering movement of the assemblies when in use.

Figure 2:
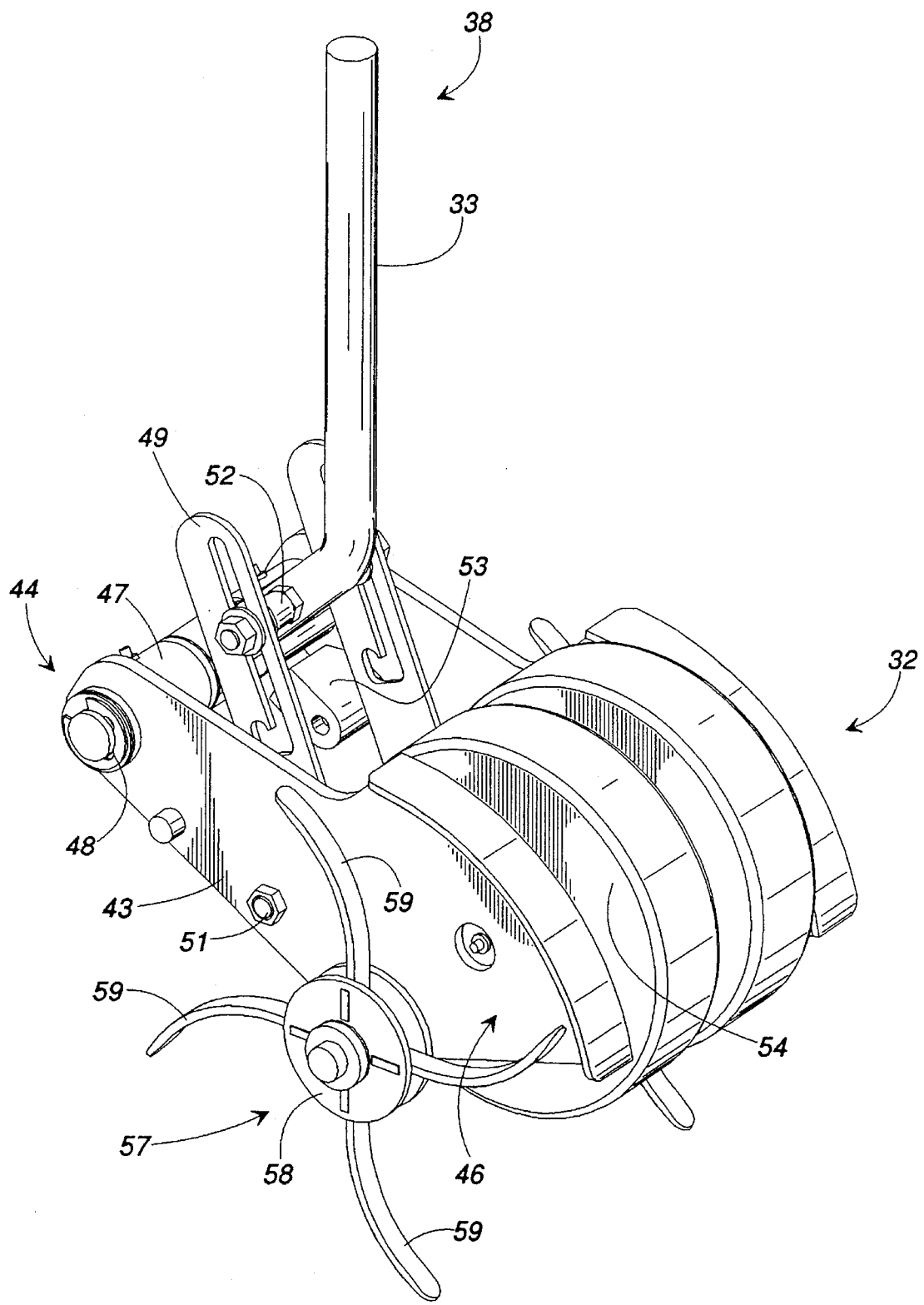
FIG. 2 is a perspective view of one of the tandem aerator wheel assemblies that forms a part of the present invention.
Figure 3:
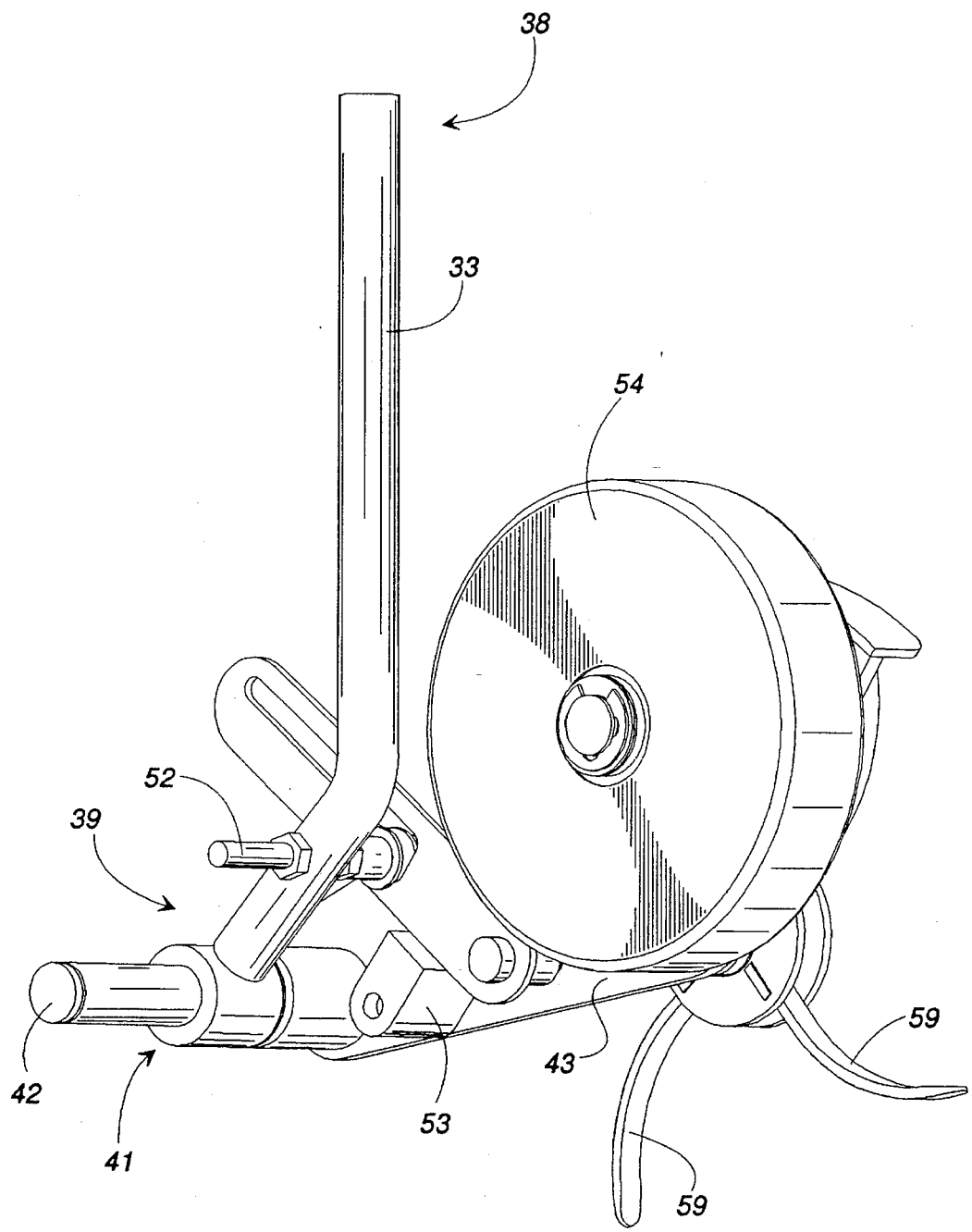
FIG. 3 is a perspective view of one of the aerator wheel assemblies with one of the tandem pivot plate assemblies removed to illustrate clearly the components of the assembly.
Figure 4:
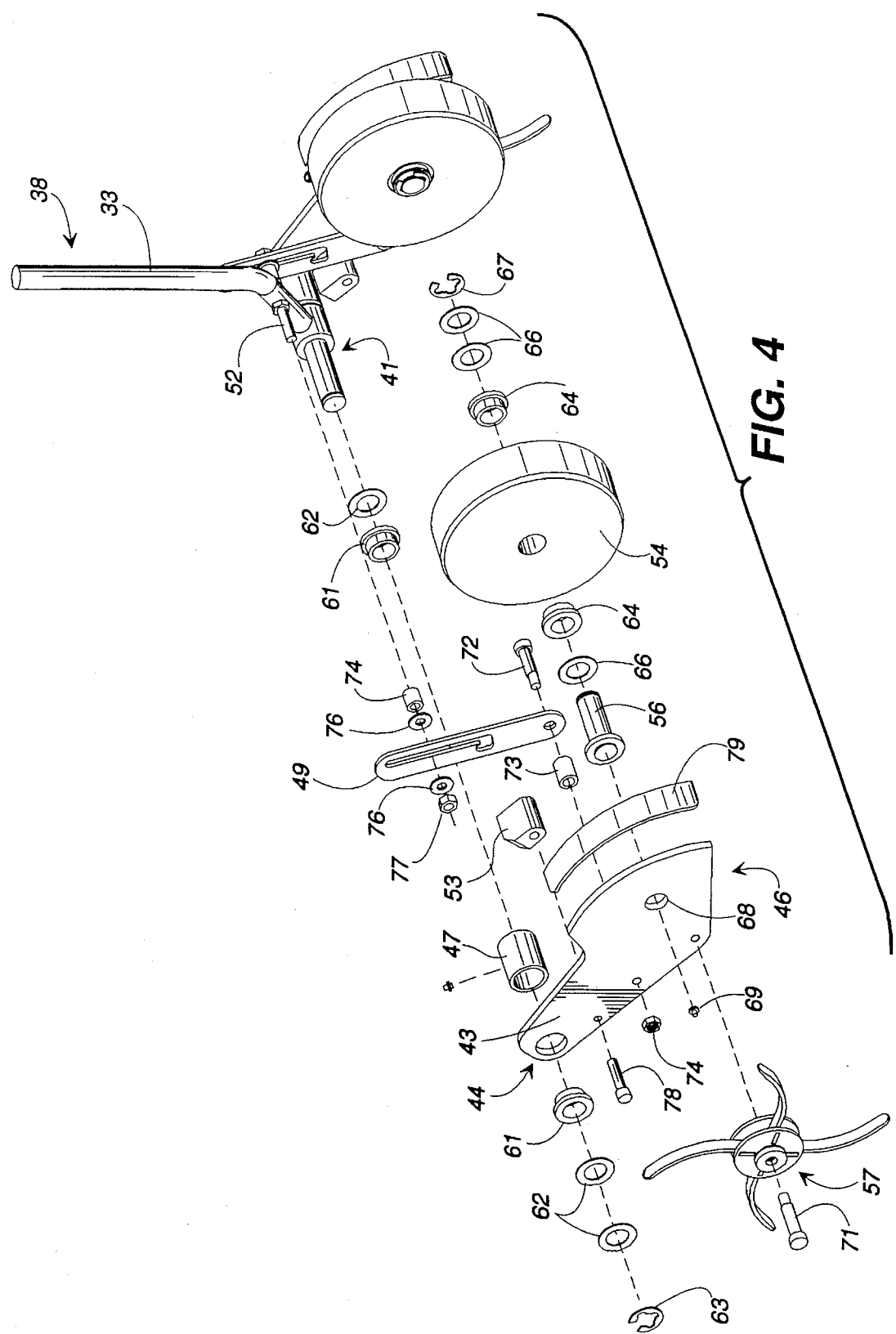
FIG. 4 is an exploded perspective view of one of the aerator wheel assemblies of this invention showing the relative configurations and orientations of the various components of the assembly.

As best illustrated in FIGS. 2 and 3, the caster pin 33 of each assembly 32 has an upper end portion 38 and a lower end portion 39 (FIG. 3). A transversely extending pivot plate axle 41 is welded or otherwise secured to the lower end portion 39 of the caster pin 33 and extends on each side of the caster pin 33 to a free end 42. As best seen in FIG. 4, a pivot plate 43 has a proximal end portion 44 and a distal end portion 46. The pivot plate 43 preferably is cut from a relatively thick metal plate to provide strength and rigidity. The pivot plate 43 is pivotally mounted at its proximal end 44 to the free end 42 of the pivot plate axle 41. In the preferred embodiment, a pivot plate is mounted to each end of the pivot plate axle 41 as best seen in FIG. 2 to form the tandem castering aerator configuration of this embodiment. Each side of the tandem assembly is a mirror image of the other side. Accordingly, only one side of the assembly will be described in detail here, but the description applies equally well to the other side of the tandem assembly.

The pivot plate 43 is spaced from the central portion of the pivot plate axle 41 by a bearing sleeve 47 and is secured on the axle by an E-clip arrangement 48, or by other suitable attachment means. With the pivot plate 43 thus mounted, the pivot plate is vertically pivotally mounted on the pivot plate axle for movement between a raised position and the lowered positioned.

A latch bar 49 is secured at one end to the pivot plate 43 by means of a nut and bolt or other appropriate fastener 51. The latch bar 49 is formed with a notched slot within which rides a latch pin 52 (FIG. 3). With this configuration, the pivot plate 43 can be releasably locked in its raised position by raising the pivot plate to such position and manipulating the latch bar 49 so that the latch pin 52 falls into the locking notch of the slot formed in the latch bar 49. To prevent the latched pivot plate from accidentally becoming unlatched and falling to its lowered position, a rotating latch bar lock block 53 is secured to the inside of the pivot plate 43 just beneath the latch bar 49 as best illustrated in FIG. 3. When the pivot plate 43 is releasably locked in its raised position, the latch bar lock block can be rotated upwardly to prevent the latch pin 52 from becoming dislodged from the locking notch formed in the latch bar 49.

A weighted wheel 54, preferably cast or cut from thick metal stock, is rotatably mounted on an axle 56 (FIG. 4) that, in turn, is welded or otherwise secured to the distal end portion 46 of the pivot plate 43. The weighted wheel 54 is thus free to rotate on its axle and is positioned such that when the pivot plate 43 is in its lowered position, the wheel 54 can engage and roll on the ground behind a mower on which the assembly is mounted. With this configuration, the wheel provides at least three distinct advantages. First, it provides the weight necessary to assure sufficient force to aerate the soil. Second, the wheel controls the optimum depth to which the spikes of the aerator wheel assembly penetrate the soil. Third, the location of the weighted wheel encourages the castering motion of the entire assembly, which, in turn, encourages the aerator assemblies to follow a mower or other frame to which they are attached.

An aerator wheel assembly 57 is rotatably secured to the pivot plate 43 at a position intermediate the proximal and distal end portions thereof and between the location where the pivot plate 43 is mounted to the axle and the location where the weighted wheel 54 is mounted to the pivot plate. The aerator wheel assembly 57 is configured and constructed according to the disclosure of the applications that form the parents of the present application. In general, the assembly 57 comprises a hub 58 from which four curved tines 59 radially project. The tines 59 are relatively wide in the axial direction of the assembly 57, relatively narrow in thickness, and are honed to a relatively sharp point on their ends. The combination of this wide knife-like construction and the unique curvature of the tines provides for easy penetration and greatly reduces the force necessary for driving the spikes into the soil for aeration. The aerator wheel assembly 57 is positioned on the pivot plate 43 so that when the weighted wheel 54 rolls on the ground, the tines 59 of the assembly 57 are driven into the soil a predetermined advantageous distance.

With the just described assembly configuration, it will be understood by those of skill in the art that the weighted wheel 54 in conjunction with the free vertical movement of the pivot plate 43 provides the necessary force to drive the tines 59 of the aerator wheel assembly 57 into and through the soil as the tandem castering assembly 32 moves across the ground behind a mower. In addition, the location of the weighted wheel 54 behind the aerator wheel assembly 57 provides a moment arm that effectively increases the force provided to the tines beyond the actual weight of the wheel 54.

In practice it has been found that, with the configuration of FIG. 2, a wheel of approximately twelve pounds in weight provides more than ample force to drive the tines 59 into and through the soil for proper aeration. In addition, when dense or packed soil is being aerated, it has been found that the inherent inertia that must be overcome to raise the wheel in conjunction with the wheel's location behind the aerator wheel assembly tends to provide even additional force for driving the tines into and through the soil. This is because, since the points of the tines lie at the corners of a square, the aerator wheel naturally wants to bump up and down as it rolls on dense soil. As the aerator wheel rolls around toward engagement of the next tine tip, the entire assembly moves down. When the tine point engages the ground, the aerator wheel and thus the assembly begins to move up. In doing so, the kinetic energy of the downwardly moving weighted wheel must first be overcome in stopping the wheel and then the weight must be accelerated upwardly against its natural rest inertia. The combined result is a force on the tine tip much greater than that provided by the weight alone or the weight with its fulcrum advantage. As the weight is raised and falls, it imparts a hammering effect to the tines that drives them into dense or packed soil with surprising efficiency. The overall result is a small compact configuration of the entire unit, which is unique in the lawn care art. This contrasts greatly with prior art aerating devices, which are large, very heavy, bulky, and usually motorized to provide sufficient force and power for proper aeration. Finally, since the weighted wheel 54 provides all the necessary force for proper aeration, the weight of the mower is not relied upon to provide force to the aerator wheel assembly 57.

With the foregoing description in mind, and with reference to FIG. 1, it will be clear that the present invention provides multiple tandem castering aerator assemblies that can be mounted behind a commercial lawnmower with each assembly castering about its caster pin 33 to follow the mower as it is moved and turned across a lawn. The assemblies 32 can rotate through a full 360 degrees so that the mower can even be backed up and the castering assemblies follow the mower. Since each pivot plate is independently pivotally mounted on its axle, the action of one of the aerator wheel assemblies does not affect any of the other aerator wheel assemblies. Thus, each assembly functions independently and, should one hit a rock or otherwise be disrupted as it aerates, the other wheels and their aeration functions are not affected. Each of the assemblies 32 is sized so that it can rotate through a full 360 degrees without impacting the next adjacent assembly.

FIG. 4 is a detailed exploded view of the present invention illustrating a preferred construction thereof. The detail of FIG. 4 provides one of skill in the art with sufficient information to make and use this invention such that an extended detailed discussion of FIG. 4 is not required. In general, however, the pivot plate 43 is seen to be mounted on its axle 41 with conventional bearings 61, a bearing sleeve 47, appropriate washers 62, and a spring-type E-clip 63. Similarly, the weighted wheel 54 is rotatably mounted on its axle 56 by means of conventional bearings 64, appropriate washers 66, and a spring-type E-clip 67. The axle 56 preferably is welded to the pivot plate 43 and an opening 68 is formed in the pivot plate to permit access to a grease fitting 69 for lubricating the weighted wheel 54.

The aerator wheel assembly 57 is secured to the pivot plate 43 by a threaded shoulder bolt 71. Similarly, the latch bar 49 is pivotally secured to the pivot plate 43 by means of a shoulder bolt 72, spacer 73, and nut 74. A spacer 74, washers 76, and a nut 77 secures the latch pin 52 within the notched slot formed in the latch bar 49. The latch bar lock block 53, which preferably is formed of an appropriate plastic, is secured to the pivot plate 43 by an appropriate bolt 78. Preferably, a guard strip 79 is welded or otherwise secured to the pivot plate 43 as shown to cover the path of travel of the aerator tines and to prevent an operator from accidentally becoming entangled in the tines as he walks behind the mower.

The invention has been described herein in terms of preferred embodiments. It will be clear to those of skill in the art, however, that various additions, deletions, and modifications might be made to the illustrated embodiments without departing from the spirit and scope of the invention as set forth in the claims.

I claim:

1. An aerator assembly for attachment to a deck of a lawn mower to aerate the soil of a lawn as the mower moves across the ground, said aerator assembly comprising:

a frame adapted to be mounted to the deck of the mower with said frame extending a predetermined distance rearwardly of the mower deck;

an elongated caster pin mounted to said frame for rotation about its longitudinal axis, said caster pin being oriented substantially vertically to extend from an upper end portion of said caster pin downwardly to a lower end portion of said caster pin;

a first pivot plate axle secured at one end to said lower end portion of said caster pin, said pivot plate axle extending substantially horizontally from said lower end of said caster pin to a free end of said pivot plate axle;

a pivot plate having a proximal end portion and a distal end portion, said pivot plate being substantially planar and being pivotally mounted at its proximal end portion to said free end of said first pivot plate axle for substantially vertical pivotal motion of said pivot plate between a lowered position relative to said first pivot plate axle and a raised position relative thereto;

a substantially circular weighted wheel having a predetermined weight and being mounted to said pivot plate adjacent its distal end for rotation of said weighted wheel about a substantially horizontal axis, said weighted wheel rolling on the ground when said aerator assembly is attached to the mower and said pivot plate is in said lowered position, said caster pin, pivot plate, and weighted wheel forming a caster assembly adapted to follow the mower as it moves across a lawn;

a spiked aerator wheel having a plurality of substantially radially projecting curved tines extending outwardly from a central hub, said aerator wheel rotatably mounted to said pivot plate at a location intermediate said proximal end portion of said pivot plate and the mounting location of said weighted wheel, said spiked aerator wheel being mounted for rotation about a substantially horizontal axis and being positioned on said pivot plate so that the weight of said weighted wheel causes said tines of said aerator wheel to be driven into the ground to aerate the soil as the mower to which said aerator assembly is attached moves across the lawn.

2. An aerator assembly as claimed in claim 1 and further comprising a second pivot plate axle, pivot plate, weighted wheel, and aerator wheel assembly secured to the lower end portion of said caster pin to form a tandem castered aerator configuration of said aerator assembly.

3. An aerator assembly as claimed in claim 2 and further comprising means for selectively and independently locking said pivot plates in their raised positions.

4. An aerator assembly as claimed in claim 3 and wherein at least two of said tandem castered aerator assemblies are mounted to said frame at spaced locations therealong.

5. An aerator assembly as claimed in claim 4 and wherein each of said aerator wheel assemblies has four projecting tines spaced about said hub at ninety degree increments with said tines being curved in the direction of forward movement of said aerator assembly.

6. An aerator assembly as claimed in claim 5 and wherein said frame is movable between a lowered position and a raised position and wherein said aerator assembly further comprises means for raising and selectively locking said frame, and thus the tandem castered aerator assemblies mounted thereto, in its raised position.

7. A castering aerator assembly for attachment to a back of a lawn mower to aerate the soil as the lawn mower moves across the ground, said aerator assembly comprising a frame, a vertically oriented caster pin mounted to said frame for rotation about a substantially vertical axis and having a lower end, a horizontally extending axle fixed to said lower end of said caster pin, a pivot plate having a proximal and a distal end and being mounted at its proximal end to said axle for substantially vertical pivotal movement between a lowered position and a raised position, a substantially circular weighted wheel mounted to said pivot plate adjacent its distal end, said wheel for urging said pivot plate to its lowered position and for engaging and rolling on the ground as the mower to which said assembly is attached moves over a lawn, and a spiked aerator wheel rotatably mounted to said pivot plate and being positioned to that as said weighted wheel urges said pivot plate to its lowered position, the spikes of said aerator wheel are driven into the soil for aeration thereof.

8. A castering aerator assembly as claimed in claim 7 and wherein said spiked aerator wheel is mounted to said pivot plate at a position intermediate its proximal end and the location where said weighted wheel is mounted to said pivot plate.

9. A castering aerator assembly as claimed in claim 8 and wherein said spiked aerator wheel comprises a hub and a plurality of tines projecting outwardly from said hub.

10. A castering aerator assembly as claimed in claim 9 and wherein said tines are curved in the direction of forward motion of said aerator assembly.

11. A castering aerator assembly as claimed in claim 10 and wherein four tines project from said hub at substantially ninety degree increments thereabout.

12. A lawn aerator comprising:

a frame;

a caster pin movably mounted to said frame;

said caster pin having an upper end and a lower end;

a pivot plate having a proximal end portion and a distal end portion;

said pivot plate being movably mounted at its proximal end portion to said caster pin and being movable between a raised position and a lowered position;

an aerator wheel assembly rotatably mounted to said pivot plate;

said aerator wheel assembly including spike means projecting therefrom for penetrating and aerating soil as said aerator wheel assembly moves across the ground;

said aerator wheel assembly being located on said pivot plate such that said spike means is positioned to penetrate and aerate the soil when said pivot plate is in its lowered position; and weight means mounted on said pivot plate for urging said pivot plate to its lowered position and for weighting said aerator wheel assembly to assure penetration of said spike means into the soil.

13. A lawn aerator as claimed in claim 12 and wherein said weight means is substantially circular, is rotatably mounted to said pivot plate, and is sized and located to roll on the ground to limit the depth of penetration of said spike means.

14. A lawn aerator as claimed in claim 13 and wherein said weight means is mounted to said pivot plate at a location adjacent its distal end and wherein said aerator wheel assembly is mounted to said pivot plate at a location intermediate said proximal end of said pivot plate and the mounting location of said weight means to increase the force with which said spike means to form a lever arm for increasing the force with which said spike means is driven into the soil by said weight means.

15. A lawn aerator as claimed in claim 12 and wherein said caster pin is mounted to said frame for rotation about a substantially vertical axis.

16. A lawn aerator as claimed in claim 12 and wherein said pivot plate is mounted to said lower end of said caster pin for pivotal movement in a substantially vertical direction between its raised and its lowered positions.

17. A lawn aerator as claimed in claim 16 and further comprising means for releasably locking said pivot plate in its raised position.

18. A lawn aerator as claimed in claim 12 and wherein said aerator wheel assembly comprises a central hub and wherein said spike means projects substantially radially from said central hub.

19. A lawn aerator as claimed in claim 18 and wherein said spike means comprises four tines projecting from said hub at equal increments thereabout and wherein each of said tines is curved in the direction of forward rotary motion of said aerator wheel assembly to enhance penetration of said tines into the soil.

20. A lawn aerator as claimed in claim 12 and wherein said frame is adapted to be mounted to the deck of a lawn mower for aeration of the soil as the lawn mower moves across a lawn.

21. A lawn aerator as claimed in claim 20 and wherein at least two caster pin, pivot plate, weight, and aerator wheel assemblies are mounted to said frame for ganged aeration of the soil as the lawn mower moves across a lawn.

22. A lawn aerator as claimed in claim 21 and wherein a pair of tandem pivot plate, weight, and aerator wheel assemblies is mounted to the lower end of each caster pin for tandem ganged aeration of the soil as the lawn mower moves across a lawn.

* * * * *